United States Patent [19]

Ownby et al.

[11] Patent Number: 4,881,710
[45] Date of Patent: Nov. 21, 1989

[54] HANGER BRACKET

[76] Inventors: Clifford H. Ownby, 3615 Pittsburg, Houston, Tex. 77005; Larry E. Lesher, 628 West Dr., Channelview, Tex. 77530

[21] Appl. No.: 185,344

[22] Filed: Apr. 25, 1988

Related U.S. Application Data

[63] Continuation of Ser. No. 917,831, Oct. 10, 1986, abandoned.

[51] Int. Cl.$^4$ .................................................. A47F 5/08
[52] U.S. Cl. ................................ 248/311.2; 248/309.1
[58] Field of Search .................... 248/65, 309.1, 311.2, 248/300, 302, 251, 207, 201, 205.1, 200, 313, 211; 211/105.2, 94, 123; 148/415, 437

[56] References Cited

U.S. PATENT DOCUMENTS

| | | | |
|---|---|---|---|
| 411,938 | 10/1889 | Suggett | 211/123 |
| 1,214,678 | 2/1917 | Hills | 211/105.2 |
| 1,481,730 | 1/1924 | Oakley | 211/123 |
| 1,530,705 | 3/1925 | Tibbott | 248/200 |
| 2,333,519 | 11/1943 | Callander | 248/201 |
| 2,381,714 | 8/1945 | Beck | 148/415 X |
| 2,435,109 | 1/1948 | Wadkins | 211/105.2 |
| 2,670,309 | 2/1954 | McClintock et al. | 148/437 X |
| 3,156,977 | 11/1964 | Logan | 211/105.2 X |
| 3,489,382 | 1/1970 | Larson | 211/105.2 X |
| 4,437,901 | 3/1984 | Gentry | 148/415 X |
| 4,596,609 | 6/1986 | Rennhack | 148/415 X |

OTHER PUBLICATIONS

Higdon et al., "Mechanics of Materials", 1960, pp. 169–197.

Primary Examiner—Ramon S. Britts
Assistant Examiner—David M. Purol

[57] ABSTRACT

A bracket used for hanging cables, splice chambers, load coils, and various other utility and telecommunications equipment on poles and walls in a vertical or horizontal position. This bracket offers increased deformation resistance and fatigue strength under intended load weights, and in addition offers increased ultimate strength under severe overload conditions.

1 Claim, 2 Drawing Sheets

HANGER BRACKET

This application is a continuation of application Ser. No. 917,831, filed Oct. 10, 1986 now abandoned.

BACKGROUND OF THE INVENTION

This invention relates generally to metal brackets used in the utility industries to support various cables and equipment. More specifically the invention relates to a load bearing bracket which can be mounted to a pole or a wall. This bracket provides a means to hang cables and equipment in a manner comparable to hanging them from conventional strand wire which normally is employed between poles to carry their weight.

Devices used to support overhead cable and equipment must be designed and manufactured to meet anticipated load requirements, and have an additional safety margin to meet actual load which may exceed the original design parameters. Because the cables and equipment which are hung from them are expensive to install and repair, these brackets must last for a considerable time when exposed to the elements.

They must be corrosion resistant, light weight yet strong, and economical to manufacture so as to become a cost-effective part of the utility distribution networks serving the public interest.

There is therefore first a need and demand for devices of this type which will meet the established performance criteria at a reasonable cost, and secondly a continuous demand for improvements to these devices that enhance their strength in order to better resist unanticipated overloads without incurring increased manufacturing costs.

Therefore such a device with enhanced performance characteristics would help raise the general levels of reliability and safety in the essential networks where they are used.

STATEMENT OF PRIOR ART

These hanger brackets are generally made of a rod to which are affixed tabs for securing the assembly to walls or poles.

The bracket is fastened to the wall or pole by various means such as screws or lag bolts which are passed through the bracket tabs and into the wall or pole.

The device is employed to support cables and equipment at such points where conventional strand wire which is strung from pole to pole to support equipment is not suitable. Generally such cables and equipment are suspended from the strand, and the bracket, by various clamps and related fixtures.

Similar devices have been manufactured previously and are generally acceptable for their intended purpose. Other forms of this device include both welded assemblies and those riveted together during the assembly process.

The welded bracket assembly consists of a length of metal rod to which are welded mounting tabs to either end.

The welded unit has several problem areas that include:

1. imperfect weld joints due to human error or malfunctioning machinery which can result in incomplete, brittle, weak welds, 2. annealed metal at the interface of the weld joint and the base metal of the rod which can produce large variations in rod strength, 3. increased incidence of fatigue failure typical with welded joints subjected to stress, because once a crack occurs it continues to grow, and 4. the need to procure expensive welding equipment and inspection gear such as x-ray devices and the need to employ skilled equipment operators in order to insure good quality in the welded joint.

The riveted bracket assembly consists of a metal rod with flattened ends to which are attached mounting tabs with rivets. The riveted bracket assembly most closely resembles the present invention.

The riveted unit is easily assembled by unskilled labor using conventional riveting equipment and can be inspected visually for manufacturing defects. However prior versions have exhibited several deficiencies the present unit addresses:

1. a sacrifice in deformation strength in an attempt to increase ultimate strength by the use of soft, low temper rod material, 2. inconsistant overall bracket strength caused by stress cracks occuring during forming operations on hard (high-temper) rod material, and 3. premature failure due to excessive stress concentrating at the interface of the rod and its flattened portions because the flattened portion was formed with a too-abrupt transistion.

In summary, examples of prior art are prone to defects in design and manufacture that can affect their performance and anticipated service life in an unpredictable and adverse manner. The present invention addresses these defects.

SUMMARY OF THE INVENTION

This invention is a bracket for mounting utility equipment on poles or walls. The bracket is comprised of a round metal rod with ends bent one hundredeighty (180) degrees in a radius of approximately one and one-half (1½) inches so the rod forms a tall "C" shape. Each end is flattened using a smoothly radiused taper at the joint between the rounded and flattened portions of the rod forming a stress diffusion transition zone. A stamped metal piece is fastened to each flattened end perpendicular to the long axis of the rod with rivets. The rod is formed and flattened while in a relatively soft temper and then netallurgically heat-treated to a stronger temper. The design of the smoothly tapered transition between the round and flattened section of the rod combined with the resulting work hardening and metallurgical heat treating give the bracket its desired characteristics.

At final assembly, all parts of the unit are very near the same temper, thus the bracket exhibits uniform and strong performance characteristics throughout various manufacturing runs. The present bracket has increased resistance to deformation, yet when accidentally overloaded beyond its rated strength it gradually deforms in such a manner to prevent total failure.

DESCRIPTION OF PREFERRED EMBODIMENTS

Figure 1:
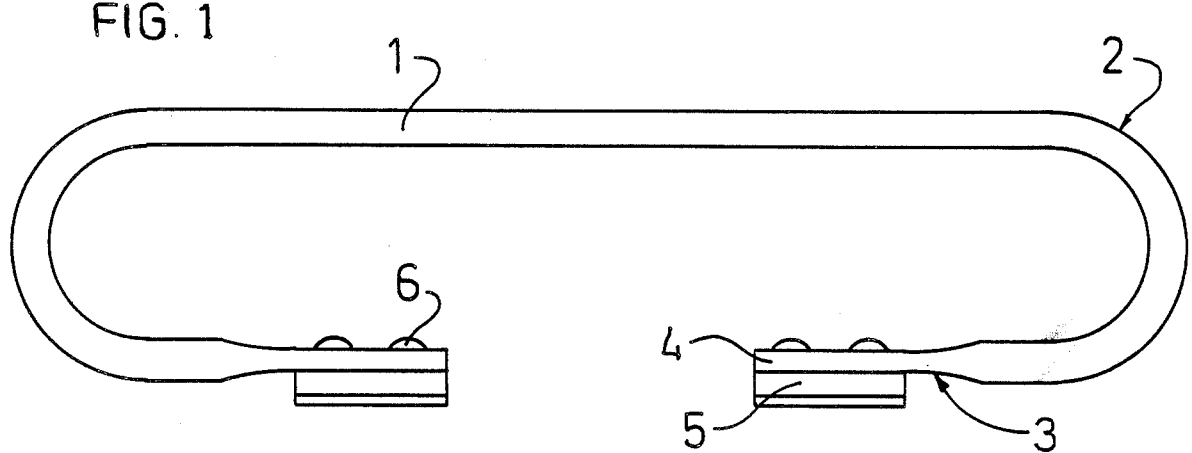

FIG. 1 illustrates a side view of the entire bracket assembly. As such it consists of a round rod 1 which is bent 180 degrees at both ends 2. The ends of the rod are formed at 3 into a smooth taper which is further formed into a flattened section 4. A stamped metal piece, the mounting tabs 5, is attached with rivets 6 to the flattened section 4.

Figure 2:
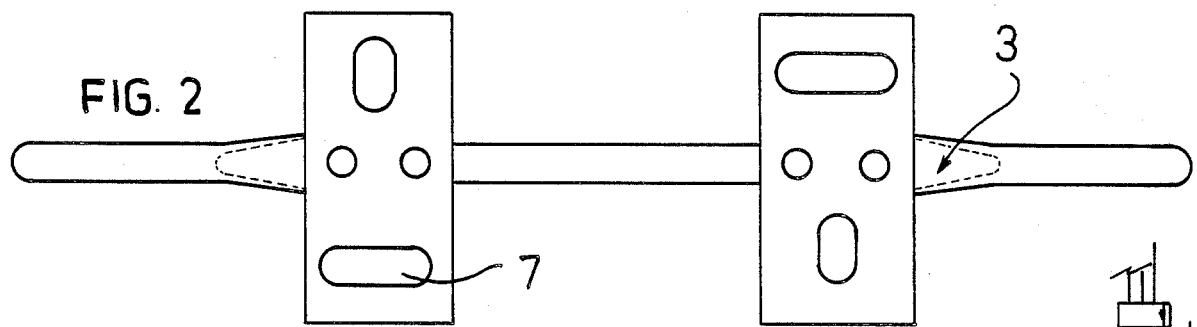

FIG. 2 illustrates a bottom view of the bracket assembly showing the shape of the tapered section 3 and various holes 7 in the mounting tabs 5.

Figure 3:
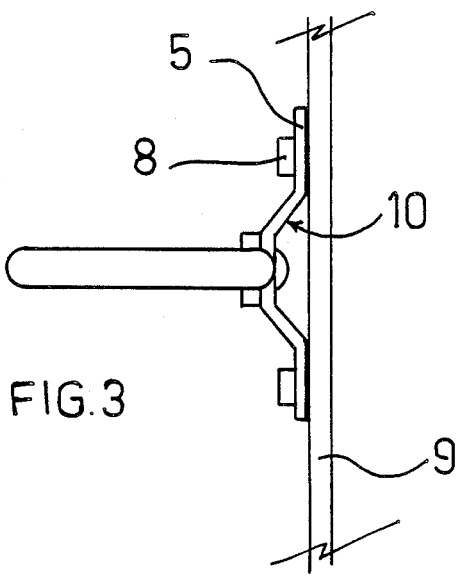

FIG. 3 illustrates an end view of the bracket assembly providing details of the mounting tab 5 by which the bracket is affixed to a wall 9 or optionally a wooden pole to similar surface, with nails or screws 8 that are passed through the slotted holes 7 which allow for proper alignment of the bracket. The mounting tab is given a radius 10 to allow it more contact area with the circumferance of a pole.

Figure 4:
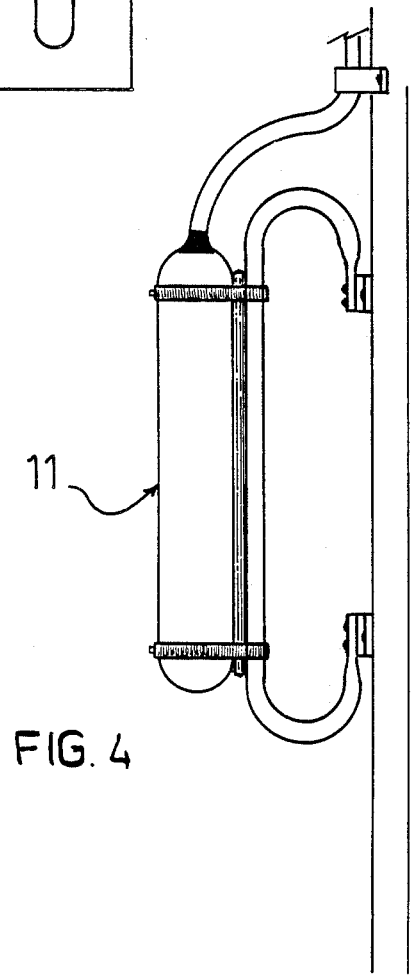
Figure 6:
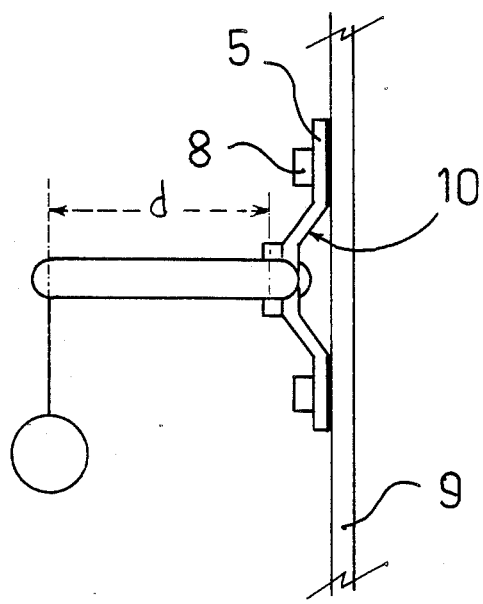
Figure 7:
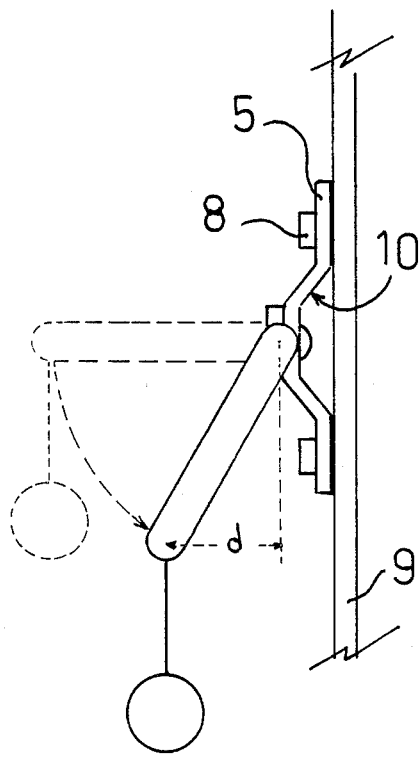

The bracket is mounted either in a vertical or horizontal fashion. FIG. 4 shows the bracket attached in a vertical fashion with the long axis of the bracket perpendicular to the ground plane. When mounted in this manner, the tensile, compressive, and shear stresses from the supported object 11 are distributed evenly. Since there is little or no torsional stress generated the weight limit the bracket can bear is generally determined by the tensile and compressive strengths of the material itself. However, a bracket suspended horizontally, parallel to the ground plane, as shown in FIGS. 6 and 7 is subjected to severe shear stress in the form of torsion which is transferred to the area where the mounting tab and rod are joined together.

The shearing strength of most metals is much lower than their tensile strength and thus becomes the limiting factor for overall bracket performance.

Figure 5:
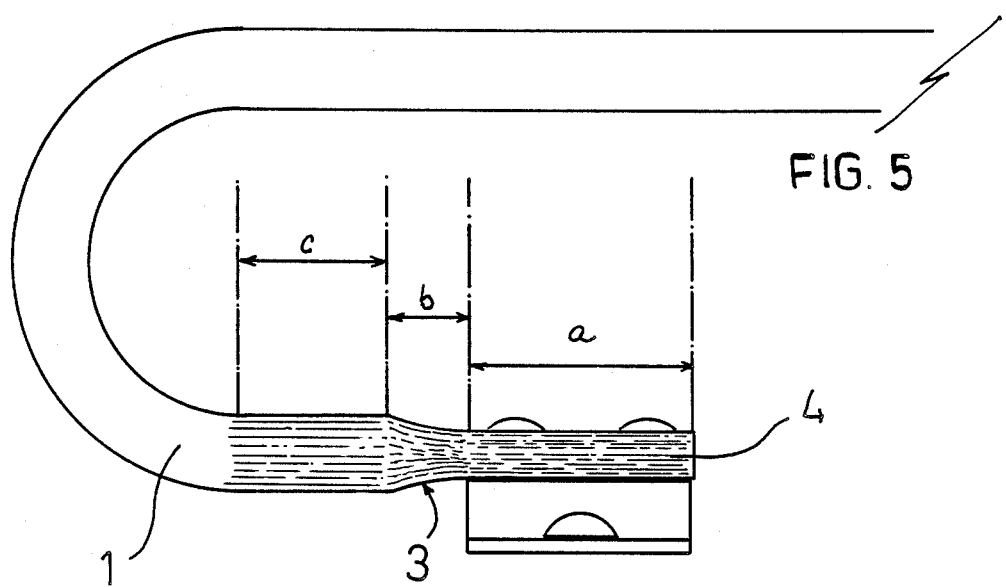

Increasing the shearing resistance of the bracket is the primary goal of the present invention and this is accomplished through a careful synthesis of design and production processes. As shown in FIG. 5 the rod 1 is formed into a smoothly tapered stress diffusion transition zone 3 which is in length approximately equal to or longer than the diameter of the rod. If the rod is made of ⅜" diameter aluminum rod, this transition zone is approximately ⅜" inch in length. This zone is delineated as b in FIG. 5. During the forming process, the grain of the metal, represented by the parallel lines drawn within the rod, is compressed to conform with the curve of the taper. The rod terminates into the flattened portion 4 whose area is delineated as a, and whose grain structure is similarly compressed and aligned. Thus the metal in section a and b of the rod is initially strengthened by work hardening and alignment of the grain structure. The metal may be formed in a relatively soft, low temper state reducing stress risers and cracks which could reduce its strength. The rod may then be brought to a harder, higher temper state through heat treatment which further increases its deformation and ultimate strength. Consequently, the assembled bracket when subjected to anticipated normal load, exhibits the desired resistance to deflection so as not to yield. If the rod is subjected to an unanticipated overload, as illustrated in FIG. 7, the suspended weight transmits torsion through the rod and into the stress diffusion zone which spreads the torsional stress over a larger area rather than allowing the stress to concentrate in a sharply localized section of the rod.

As the load forces increase, the twisting forces also increase until the unit approaches its torsional shearing strength limit. However, before the shear strength limit is reached and the unit fails, the tapered portion 3 of FIG. 5, deforms, yields, and begins to rotate downwards, as shown in FIG. 7 so as to reduce the apparent load as the moment arm d decreases. The entire rod and its load does drop downwards, but since the shear stress has decreased the bracket does not fail. At this point if the bracket continues to bend, flexural forces which the unit can better resist become more significant than the shear stress which has been largely relieved and the strength of the bracket approaches the absolute tensile and compressive strengths of the material. Thus the bracket exhibits a resistance to deformation combined with a built in mechanism to greatly reduce the possibility of premature catastrophic failure.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of this invention.

What is claimed as new is as follows:

1. A bracket for supporting communication equipment from a vertical support surface in which the communication equipment can be adversely affected by magnetic fields, said bracket comprising an aluminum rod formed into a C shape, said rod being circular in cross section over a major portion of its length and including a straight middle portion and a pair of ends, each of said pair of ends being reversely bent inwardly relative to said middle portion toward each other to form said C shape, said reversely bent ends being smoothly curved through 180°, each of said pair of ends including a reversely bent portion which is round in cross section, a straight portion parallel to said middle portion which is round in cross section, a smoothly tapered transition zone, and a terminal flattened end section, said smoothly tapered transition zone including a pair of opposed surfaces which diverge from the straight portion to the flattened end section and a pair of opposed surfaces which converge from the straight portion to the flattened end section, said smoothly tapered transition zone being disposed between said straight portion and said flattened end section, each said straight portion, each said smoothly tapered transition zone and each said flattened end section being coaxially aligned along a single straight line axis, each of said flattened end sections including opposed parallel surfaces and having a rectangular cross section and including a pair of wide parallel surfaces merging with the converging surfaces forming the transition zone and a pair of narrow parallel surfaoes merging with the diverging surfaces forming the transition zone, said pair of wide parallel surfaces being disposed in perpendicular relation to the plane of the middle portion, bent portion and straight portion of the bracket, a mounting tab extending transversely of each flattened end section, rivet means securing the mounting tabs to said flattened end sections, said rivet means including spaced rivets to connect the tab to the flattened end section at spaced points to rigidly mount the tabs, each of said tabs including an aperture on opposite sides of the flattened end section to receive fastening means to mount the tabs on said vertical support surface with the bracket disposed horizontally and said converging surfaces forming the transition zone, the pair of wide surfaces forming the flattened end section and the tabs being disposed vertically, said smoothly tapered transition zone forming a stress diffusion zone in which torsional stress causes the transition zone and flattened sections to deform downward before the torsional shear load limit is reached within the transition zone and flattened end sections, said downward deformation of the horizontal bracket reducing the moment arm of torsion transmitted to said transition zone, the aluminum rod forming the bracket being metallurgically altered by a combination of cold work hardening and alignment of the grain of the aluminum rod at the transition zone followed by heat treating to increase deformation and break strength by increasing the temper state of the aluminum rod.

* * * * *